(12) United States Patent
Tseng

(10) Patent No.: US 11,655,164 B2
(45) Date of Patent: May 23, 2023

(54) ELECTROLYSIS CELL AND HOUSING

(71) Applicant: Anthony Tseng, Walnut, CA (US)

(72) Inventor: Anthony Tseng, Walnut, CA (US)

(73) Assignee: AYRO CORPORATION, Walnut (CA)

( * ) Notice: Subject to any disclaimer, the term of this patent is extended or adjusted under 35 U.S.C. 154(b) by 191 days.

(21) Appl. No.: 17/156,214

(22) Filed: Jan. 22, 2021

(65) Prior Publication Data
US 2022/0234917 A1  Jul. 28, 2022

(51) Int. Cl.
C25B 15/08 (2006.01)
C02F 1/461 (2023.01)
C02F 1/00 (2023.01)

(52) U.S. Cl.
CPC .......... *C02F 1/46109* (2013.01); *C02F 1/001* (2013.01); *C02F 1/4618* (2013.01); *C02F 2001/46119* (2013.01); *C02F 2001/46185* (2013.01); *C02F 2201/004* (2013.01); *C02F 2201/4617* (2013.01); *C02F 2201/4618* (2013.01); *C02F 2201/46115* (2013.01)

(58) Field of Classification Search
CPC .......... C02F 2201/46115; C02F 1/4618; C02F 1/46104; C02F 9/00; C02F 1/001; C02F 1/46109; C02F 2201/46145; C02F 1/46; C02F 1/4604; C02F 1/461; C25B 15/08; C25B 1/04; C25B 9/19; C25B 9/00; C25B 1/46

See application file for complete search history.

(56) References Cited

U.S. PATENT DOCUMENTS

| | | | |
|---|---|---|---|
| 6,572,902 B2 | 6/2003 | Abramowitz et al. | |
| 6,652,719 B1 | 11/2003 | Tseng | |
| 6,656,334 B2 | 12/2003 | Tseng et al. | |
| 6,997,972 B2 | 2/2006 | Tseng | |
| 8,540,856 B1 * | 9/2013 | Mayers, Sr. | C25B 9/19 204/266 |
| 8,561,809 B2 | 10/2013 | Tseng | |
| 2003/0015418 A1 * | 1/2003 | Tseng | C02F 1/46104 204/263 |
| 2018/0056021 A1 * | 3/2018 | Lin | C25B 15/00 |

* cited by examiner

*Primary Examiner* — Zulmariam Mendez
(74) *Attorney, Agent, or Firm* — Averill, Green & Kim; Philip Y Kim; Kenneth L Green

(57) ABSTRACT

An electrolysis cell and housing provides for simple, tool-less cell installation and removal of the electrolysis cell. The electrolysis cell includes an anode and a cathode and requires periodic removal of the electrolysis cell from the housing for cleaning or replacement due to accumulation of deposits on the anode and the cathode. The electrolysis cell includes three push-in fluid connectors and two push-in electrical connections. A filter may be included serially between a water inlet and the electrolysis cell and may include two push-in fluid connectors. A housing rear cover may hold the electrolysis cell and filter in place in the housing and may be removed and reattached to access the electrolysis cell without tools.

15 Claims, 3 Drawing Sheets

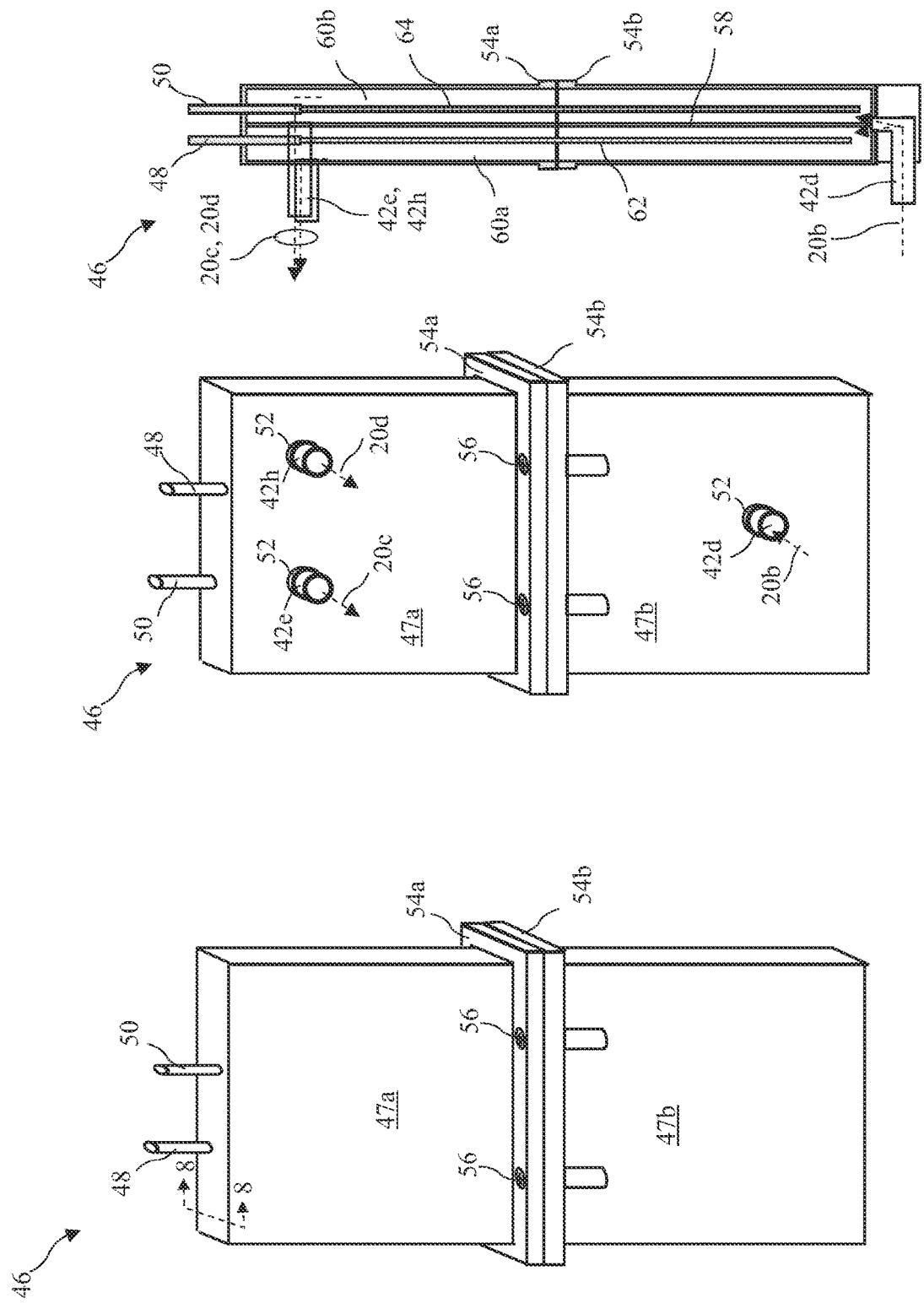

ELECTROLYSIS CELL AND HOUSING

BACKGROUND OF THE INVENTION

The present invention relates to electrolysis cells and in particular to an electrolysis cell which is quickly installable and removable from a housing without requiring tools.

Electrolyzed water is produced by electrolysis, a process involving the passage of Direct Current (DC) through an anode and a cathode immersed in water. The anode and cathode reside in a chamber with a membrane separating the anode from the cathode. Over time, electro-deposits, generally calcium and magnesium, etc., are generally deposited on the cathode and reduce or prevent continued electrolysis. While the deposited material may be removed by reversing polarity or passing an appropriate cleaning solution, such cleaning is often insufficient, and the electrolysis cell must be removed from the housing for cleaning or replacement. Further, the anode and/or cathode erode over time and require replacement. Known electrolysis cells and housings require disassembly using tools and requiring careful manipulation of fasteners and connectors. Over tightening, cross-threading, etc. may damage the electrolysis cell or the housing.

BRIEF SUMMARY OF THE INVENTION

The present invention addresses the above and other needs by providing an electrolysis cell and housing which provides for simple, toolless cell installation and removal of the electrolysis cell. The electrolysis cell includes an anode and a cathode and requires periodic removal of the electrolysis cell from the housing for cleaning or replacement due to accumulation of deposits on the anode and the cathode. The electrolysis cell includes one fluid inlet and two fluid outlets, and two push-in electrical connections. A filter may be included serially between a water inlet and the electrolysis cell and may include two push-in fluid connectors. A housing rear cover may hold the electrolysis cell and filter in place in the housing and may be removed and reattached to access the electrolysis cell without tools.

In accordance with one aspect of the invention, there is provided an electrolysis cell and housing having simple push-in fluid connections between the electrolysis cell and the housing. Push-in fluid connections include a male portion with O-Ring seals or the like, and a cooperating female portion. Push-in electrical connections include opposing curved clips attached to the housing and anode and cathode connectors which engage the clips. The push-in connections allow tool-less replacement of the electrolysis cell in the housing.

In accordance with another aspect of the invention, there is provided an electrolysis cell and housing including a removable cover. The cover retains the electrolysis cell in the housing, and removal of the cover allows simple extraction and replacement of the electrolysis cell. The cover includes a lip which is inserted into a lip slot in the housing, and a thumbscrew, allowing tool-less attachment and removal of the cover.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 7A shows a front view of the electrolysis cell according to the present invention.

FIG. 7B shows a rear view of the electrolysis cell according to the present invention.

FIG. 8 shows a cross-sectional view of the electrolysis cell according to the present invention taken along line 8-8 of FIG. 7A.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1C:
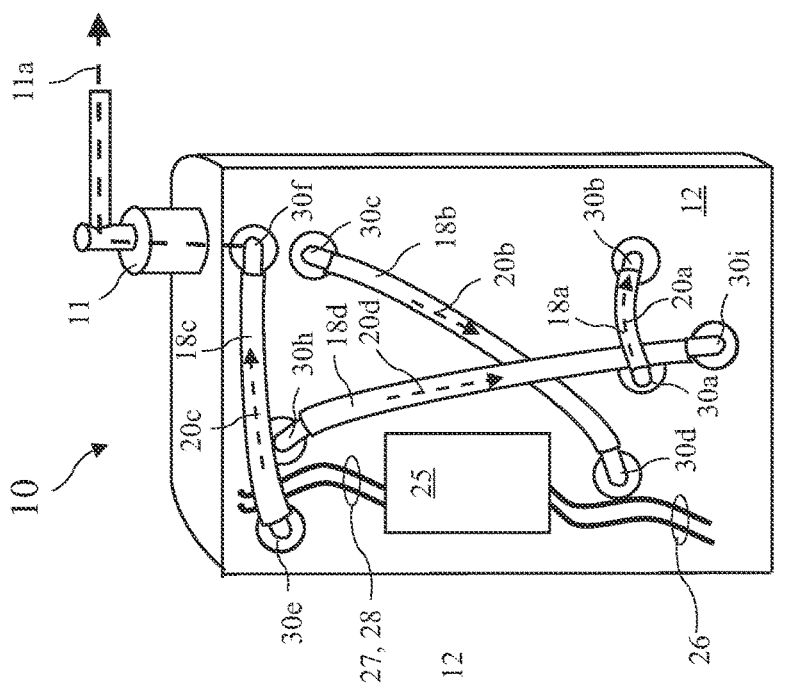
FIG. 1C shows an interior view of the electrolysis cell assembly according to the present invention with a front cover removed.
Figure 1B:
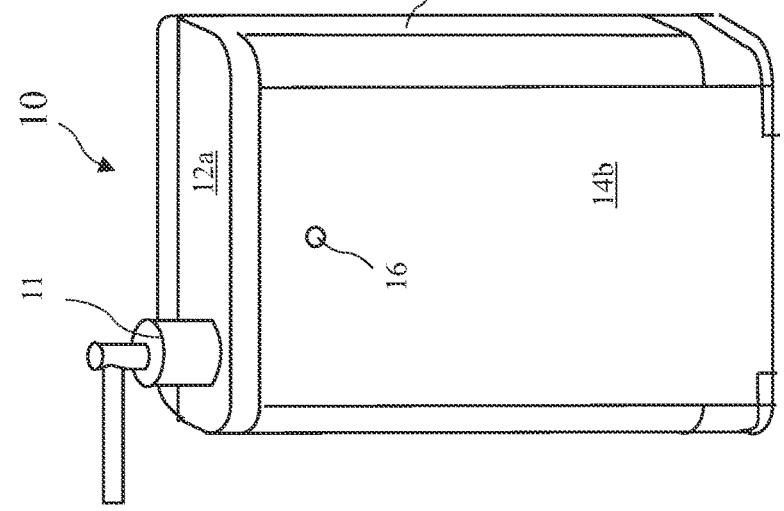
FIG. 1B shows a rear view of the electrolysis cell assembly according to the present invention.
Figure 1A:
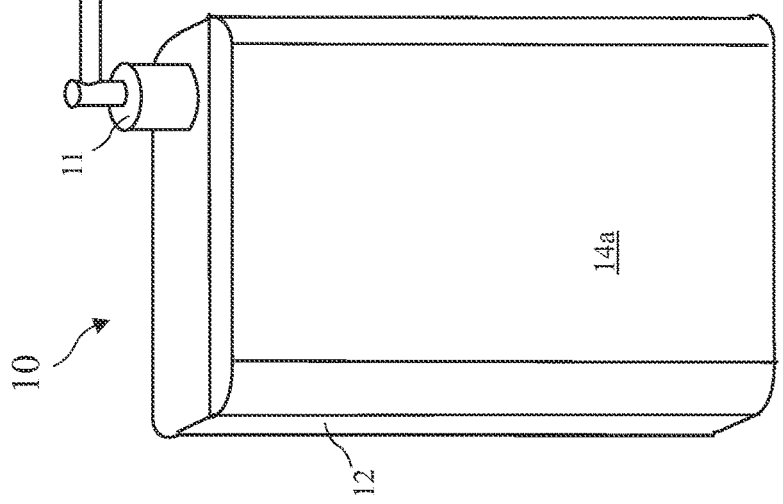
FIG. 1A shows a front view of an electrolysis cell assembly according to the present invention.

A front view of an electrolysis cell assembly 10 according to the present invention is shown in FIG. 1A and a rear view of the electrolysis cell assembly 10 is shown in FIG. 1B. The electrolysis cell assembly 10 includes an electrolysis cell housing 12, and front and rear removable housing covers 14a and 14b. The rear cover 14b is held in place by a cover fastener 16 which is preferably toolless or releaseable without tools (for example, a thumbscrew), which retains the rear cover 14b on the electrolysis cell housing 12, providing toolless access to a filter 44 and electrolysis cell 46 (see FIG. 2) inside the electrolysis cell assembly 10. An outlet 11 provides a flow of electrolyzed water 11a from the electrolysis cell assembly 10.

A front view of the electrolysis cell assembly 10 is shown in FIG. 1C with the front cover 14a removed. Leads 26 provide power to circuit 25, and the circuit 25 provides power to anode and cathode leads 27 and 28. The leads 26 may extend from the electrolysis cell housing 12 for electrical connections and may extend from the rear, sides, or bottom of the electrolysis cell housing 12, or may connect to batteries in the electrolysis cell assembly 10. During operation, a positive Direct Current (DC) signal is provided to the anode lead 27 and a negative DC signal is provided to the cathode lead 28, to cause electrolysis to take place.

An inlet flow 20a in line 18a enters the back of the housing 12 through port 30a and is in fluid communication with a filter 44 (see FIG. 2) through port 30b. A filtered flow 20b is carried by line 18b from a port 30c in fluid communication with the filter 44 to a port 30d in fluid communication with an electrolysis cell 46 (see FIG. 2). An electrolyzed water flow 20c passes from port 30e in communication with the electrolysis cell 46 through line 18c to a port 30f in communication with the outlet 11 releasing electrolyzed water 11a (see FIG. 1C). A waste water flow 20d in fluid communication with the electrolysis cell 46 through port 30h passes through line 18d to port 30i for release.

Figure 2:
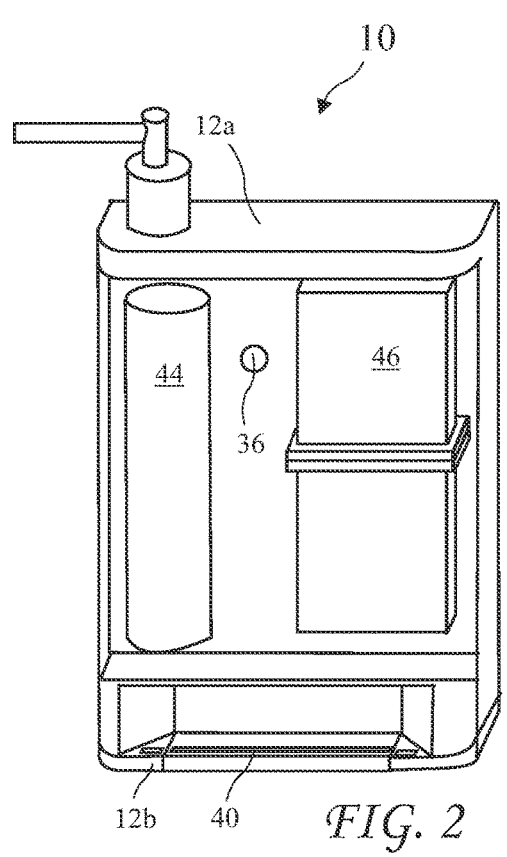
FIG. 2 shows a filter and an electrolysis cell inside the electrolysis cell assembly according to the present invention, with a rear cover removed.

The filter 44 and the electrolysis cell 46 are shown inside the electrolysis cell housing 12 with the rear cover 14b removed in FIG. 2. The electrolysis cell housing 12 includes a fastener mating 36 near the top 12a of the electrolysis cell housing 12 cooperating with the fastener 16 (see FIG. 1) and a lip slot 40 proximal to the housing bottom 12b for receiving a cover lip 38 (see FIG. 5) for engaging the bottom of the rear cover 14b.

Figure 3:
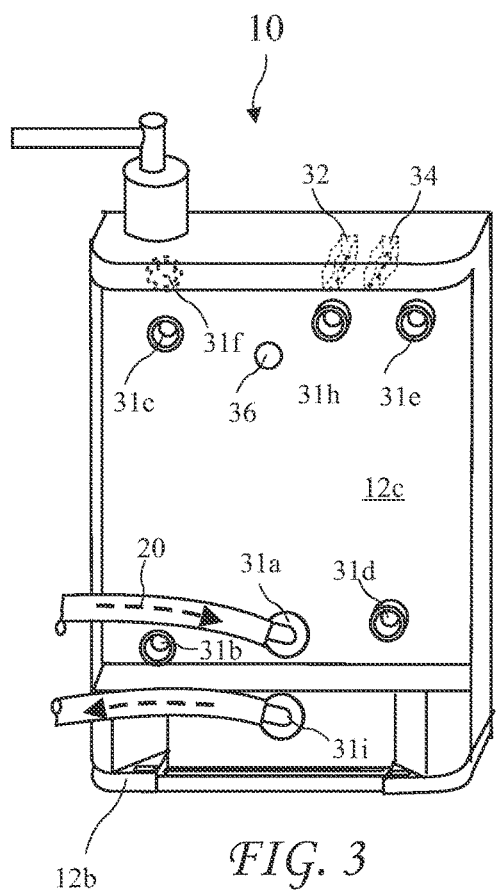
FIG. 3 shows the electrolysis cell assembly according to the present invention, with the electrolysis cell, filter, and rear cover removed.

The electrolysis cell assembly 10, with the filter 44, the electrolysis cell 46, and rear cover 14b removed, is shown in FIG. 3. Female ends 31b-31e and 31h of the ports 30b-30e and 30h reach into a housing interior 12c. Electrical connections comprising anode and cathode clips 32 and 34 are electrically connected to anode and cathode leads 27 and 28 respectively, and reside in the housing interior 12c. The anode and cathode clips 32 and 34 preferably have a shape resembling one period of a sine wave, having opposing outward bulges to capture anode and cathode connectors 48 and 50 (see FIGS. 7A-8) respectively. The female ends 31b (filter inlet port), 31c (filter outlet port), 31d (a cell inlet port), 31e (a cathode outlet port), 31h (an anode outlet port) preferably have smooth interiors to accept connecters, preferably nipples, 42b-42e, and 42h (see FIG. 7B) reaching rearward from the filter 44 and electrolysis cell 46. The anode and cathode clips 32 and 34 may also be male to female connecters, or any suitable electrical connectors.

Figure 4B:
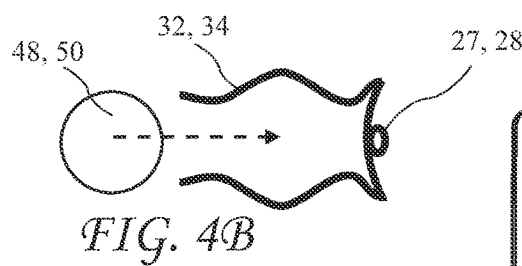
FIG. 4B shows a top view of the anode clip and anode post, or the cathode clip and cathode post, according to the present invention.
Figure 4A:
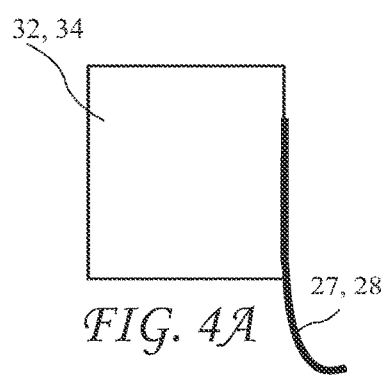
FIG. 4A shows a side view of an anode clip and anode post, or a cathode clip and cathode post, according to the present invention.

A side view of the anode clip 32, or the cathode clip 34 is shown in FIG. 4A and a top view of the anode clip and anode post, or the cathode clip and cathode post is shown in FIG. 4B. The clip 32 and 34 accept a vertical post attached to the electrolysis cell 46 and the female ends 31b-31e and 31h shaped to accept the nipples 42b and 42c attached to the filter 44, and nipples 42d, 42e, and 42h attached to the electrolysis cell 46, allowing the filter 44 and the electrolysis cell 46 to be attached to and detached from the electrolysis cell housing 12 without tools.

Figure 5:
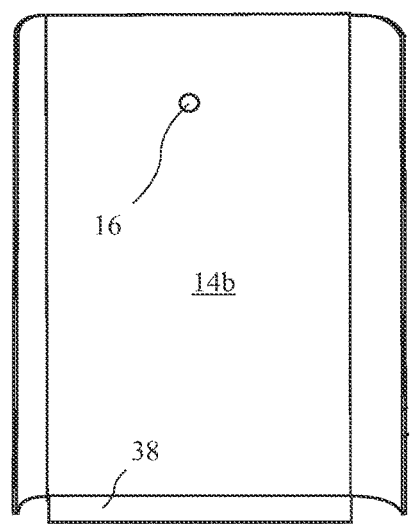
FIG. 5 shows a rear view of the rear cover according to the present invention.

FIG. 5 shows a rear view of the rear cover 14b. The cover fastener 16 reaches through the rear cover 14b to engage the fastener mating 36 attached to the electrolysis cell housing 12c, and the cover lip 38 extends down from the rear cover 14b to engage the lip slot 40 (see FIG. 2) of electrolysis cell housing 12, to attach the rear cover 14b to the housing 12. Further, the rear cover 14b may rest against the electrolysis cell 46 and/or the filter 44 to retain the engagement of the nipples 42b and 42c of the filter 44 and nipples 42d, 42e and 42h of the electrolysis cell 46, with the female ends 31b-31e and 31h and engagement of the anode and cathode connectors 48 and 50 with the clips 32 and 34. While such retention by the housing cover is simple and thus preferred, the engagement of the nipples 42b-42e and 42h with the female ends 31b-31e and 31h and engagement of the anode and cathode connectors 48 and 50 with the clips 32 and 34 may be another form and those skilled in the art will recognize various means for retaining the engagement of the nipples 42b-42e, and 42h with the female ends 31b-31e and 31h and engagement of the anode connector 48 and cathode connecter 50 with the clips 32 and 34, for example, a strap.

Figure 6:
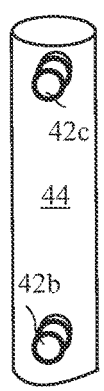
FIG. 6 shows a filter according to the present invention.

The rear view of the filter 44 is shown in FIG. 6. The filter 44 includes the unfiltered inlet port 42b and the filtered outlet port 42c. The unfiltered inlet port 42b and the filtered outlet port 42c may engage the housing 12 in the same manner as the ports 42d, 42e and 42h of the electrolysis cell 46 (see FIG. 7B).

A front view of the electrolysis cell 46 is shown in FIG. 7A, a rear view of the cell 46 is shown in FIG. 7B, and a cross-sectional view of the electrolysis cell 46 taken along line 8-8 of FIG. 7A is shown in FIG. 8. The cell 46 includes upper and lower cases 47a and 47b respectively. The upper and lower cases 47a and 47b include flanges 54a and 54b respectively, preferably attached by screws 56, allowing disassembly. Those skilled in the art will recognize other methods of attaching the upper and lower cases 47a and 47b include, for example, with an adhesive or external clamps.

The filtered water flow 20b flows into port 42d into the base of the cell 46 and is split into two flows into the chambers 60a and 60b and released as electrolyzed water flow 20c through port 42e and waste water flow 20d through port 42h. An anode plate 62 and a cathode plate 64 electrically connected to anode connector 48 and cathode connector 50 respectively, reside in the case 54 and preferably are separated by a membrane 58 splitting the interior of the case 54 into two chambers 60a and 60b. The membrane 58 preferably allows ions and minerals to pass therethrough. For electrolysis to make acid water or sanitize water, the anode plate 62 and cathode plate 64 may be any metal. For drinking water, the anode 48 and cathode 50 are preferably titanium coated with platinum or iridium.

The electrolysis cell assembly 10 may be integrated into a system including a flow rate regulator and/or a pump.

The present invention is an improvement of the device disclosed in U.S. Pat. No. 6,656,334 and the '334 patent is herein incorporated by reference.

While the invention herein disclosed has been described by means of specific embodiments and applications thereof, numerous modifications and variations could be made thereto by those skilled in the art without departing from the scope of the invention set forth in the claims.

I claim:

1. An electrolysis assembly, comprising:
   a housing having a cell inlet port, an anode outlet port, a cathode outlet port, an anode terminal electrically connected to a positive Direct Current (DC) source and a cathode terminal electrically connected to a negative lead of the DC source; and
   an electrolysis cell residing in the housing behind the housing cover, the electrolysis cell installable and removable from the housing without tools, and including:
   a cell interior;
   a membrane separating the cell interior into an anode side and cathode side;
   an anode residing in the anode side;
   an anode connector configured to electrically connect to the anode terminal;
   a cathode residing in the cathode side;
   a cathode connector configured to electrically connect to the cathode terminal;
   an inlet port configured to mate to the cell inlet port;

an anode releasing port configured to engage the anode outlet port of the housing; and a cathode releasing port configured to engage the cathode outlet port of the housing, wherein:

the housing includes a filter inlet port and a filter outlet port;

a filter including an unfiltered inlet port and a filtered outlet port;

the unfiltered inlet port engages the filter inlet port by inserting the filter into the housing; and the filtered outlet port engages the filter outlet port by inserting the filter into the housing.

2. The electrolysis assembly of claim 1, wherein:

The electrolysis assembly includes a front housing cover of the housing; and the electrolysis cell is retained in the housing by attaching the front housing cover to the housing.

3. The electrolysis assembly of claim 1, wherein:

the inlet port engages the cell inlet port by inserting the electrolysis cell into the housing;

the anode releasing port engages the anode outlet port by inserting the electrolysis cell into the housing; and a cathode releasing port engages the cathode outlet port by inserting the electrolysis cell into the housing.

4. The electrolysis assembly of claim 3, wherein:

the cell inlet port, the anode outlet port, and the exit ports have smooth unobstructed cylindrical interiors;

the inlet port, the anode releasing port, and the cathode releasing port have cylindrical exteriors; and O-Rings residing on the cylindrical exteriors provide an interference fit inside the smooth unobstructed cylindrical interiors.

5. The electrolysis assembly of claim 3, wherein:

the anode connector engages the anode terminal by inserting the electrolysis cell into the housing; and the cathode connector engages the cathode terminal by inserting the electrolysis cell into the housing.

6. The electrolysis assembly of claim 5, wherein: anode and cathode clips have a shape resembling one period of a sine wave, having opposing outward bulges to capture the anode and the cathode connectors respectively.

7. The electrolysis assembly of claim 1, wherein the electrolysis cell includes a two piece case comprising an upper case attachable to and separable from a lower case.

8. The electrolysis assembly of claim 7, wherein the two piece case is held together by screws.

9. The electrolysis assembly of claim 1, a front housing cover, both removable and replaceable from the housing.

10. The electrolysis assembly of claim 8, wherein the front housing cover is removable and replaceable from housing without tools.

11. The electrolysis assembly of claim 1, further including a filter residing inside the housing.

12. The electrolysis assembly of claim 11, wherein the filter is serially connected between an unfiltered water inlet and the electrolysis cell.

13. The electrolysis assembly of claim 1, wherein:

The electrolysis assembly includes a front cover of the housing; and the filter is retained in the housing by attaching the front cover to the housing.

14. An electrolysis assembly, comprising:

a housing having a filter inlet port and a filter outlet port, a cell inlet port, an anode outlet port, a cathode outlet port, an anode terminal electrically connected to a positive Direct Current (DC) source and a cathode terminal electrically connected to a negative lead of the DC source;

an electrolysis cell residing in the housing, the electrolysis cell installable and removable from the housing without tools, and including:

a cell interior;

a membrane separating the cell interior into an anode side and cathode side;

an anode residing in the anode side;

an anode connector configured to electrically connect to the anode terminal;

a cathode residing in the cathode side;

a cathode connector configured to electrically connect to the cathode terminal;

an inlet port configured to mate to the cell inlet port;

an anode releasing port configured to engage the anode outlet port of the housing; and a cathode releasing port configured to engage the cathode outlet port of the housing; and a filter serially connected between an unfiltered water inlet and the electrolysis cell, the filter comprising:

unfiltered inlet port and a filtered outlet port;

the unfiltered inlet port engaging the filter inlet port by inserting the filter into the housing; and the filtered outlet port engaging the filter outlet port by inserting the filter into the housing.

15. An electrolysis assembly, comprising:

a housing having a filter inlet port and a filter outlet port, a cell inlet port, an anode outlet port, a cathode outlet port, an anode terminal electrically connected to a positive Direct Current (DC) source and a cathode terminal electrically connected to a negative lead of the DC source;

a housing front cover attached to the housing by a toolless fastener;

an electrolysis cell residing in the housing, the electrolysis cell retained in the housing by the front cover, the electrolysis cell including:

a cell interior;

a membrane separating the cell interior into an anode side and cathode side;

an anode residing in the anode side;

an anode connector configured to electrically connect to the anode terminal;

a cathode residing in the cathode side;

a cathode connector configured to electrically connect to the cathode terminal;

an inlet port configured to mate to the cell inlet port;

an anode releasing port configured to engage the anode outlet port of the housing; and a cathode releasing port configured to engage the cathode outlet port of the housing; and a filter serially connected between an unfiltered water inlet and the electrolysis cell, the filter retained in the housing by the front cover, the filters including:

unfiltered inlet port and a filtered outlet port;

the unfiltered inlet port engaging the filter inlet port by inserting the filter into the housing; and the filtered outlet port engaging the filter outlet port by inserting the filter into the housing.

* * * * *